Figures 1, 2, 3:
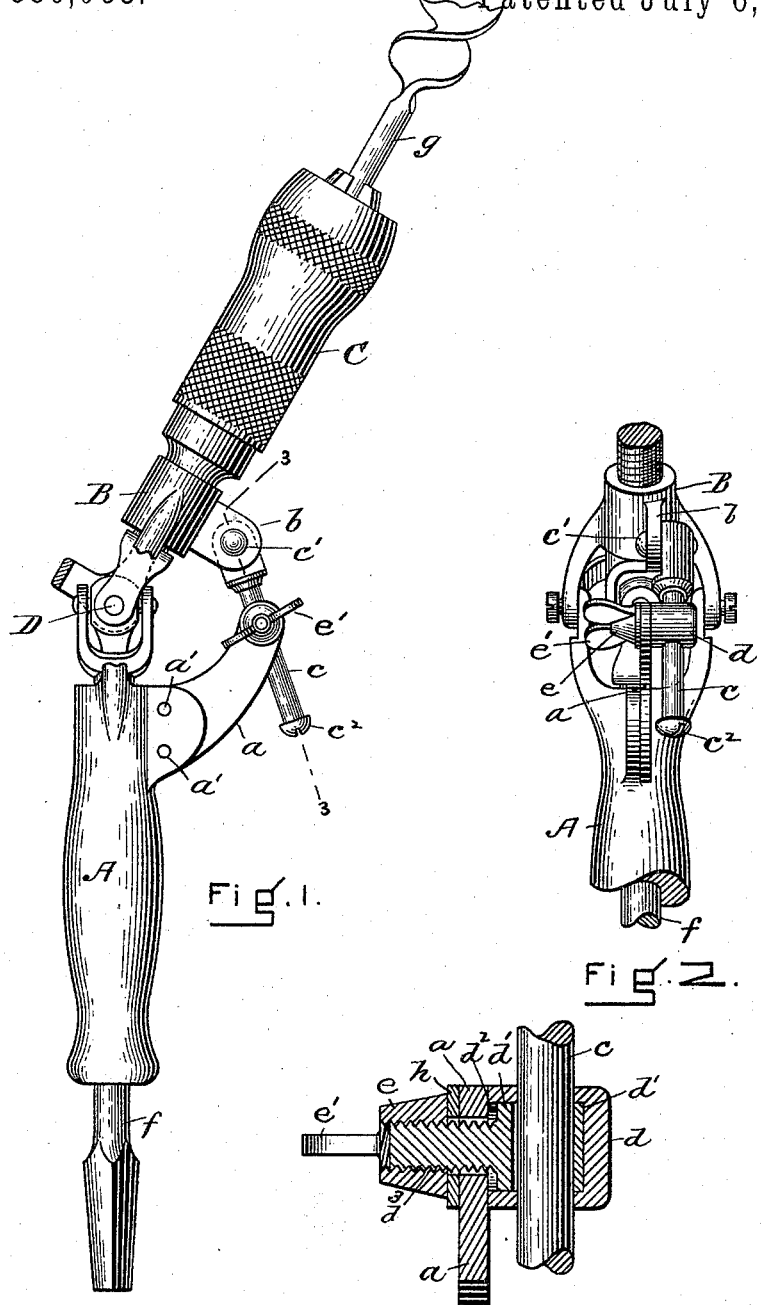

(No Model.)

W. H. McCOY.
ANGLE BORER.

No. 586,053. Patented July 6, 1897.

WITNESSES
Frank G. Parker.
O. W. Gill.

INVENTOR
William H. McCoy.
by Bowdoin S. Parker
his atty.

UNITED STATES PATENT OFFICE.

WILLIAM H. McCOY, OF MILLER'S FALLS, MASSACHUSETTS, ASSIGNOR TO THE MILLER'S FALLS COMPANY, OF SAME PLACE.

ANGLE-BORER.

SPECIFICATION forming part of Letters Patent No. 586,053, dated July 6, 1897.

Application filed November 5, 1896. Serial No. 611,125. (No model.)

*To all whom it may concern:*

Be it known that I, WILLIAM H. MCCOY, a citizen of the United States, residing at Miller's Falls, in the county of Franklin and State of Massachusetts, have invented a new and useful Improvement in Angle-Borers, of which the following, in connection with the drawings, is a specification.

My invention relates to improvements in angle-borers, and more especially to the clamping device for securing the arms of the borer at any angle and in a more secure and efficient manner than is found in the ordinary article of this class now upon the market and known to me. I attain these objects by the mechanism illustrated in the accompanying drawings, in which—

Figure 1 is a general view of the borer and clamping device. Fig. 2 is a view of the clamping device and attachments. Fig. 3 is a sectional view of the clamp, showing on the line 3 3 of Fig. 1.

In the drawings like letters of reference indicate corresponding parts.

A represents the handle part of the borer; B, the frame; C, the bit-holder; D, the knuckle-joint and forked driving mechanism usually employed in this class of tools.

$a$ is a fixed arm secured to the handle A by the rivets or screws $a'$. A projection $b$ is preferably formed upon the frame B. To this is secured the movable arm or rod $c$ by the screw or pivot $c'$. A small round-headed screw $c^2$ is preferably placed in the end of the rod $c$, which serves to prevent the rod slipping out of the clamp and also as forming a finish to the rod.

The clamp proper consists of the shell $d$, the stud $d'$, provided with the threaded end $d^3$, and the thumb-nut $e$, having the thumb-piece $e'$. The borer is operated in the usual manner by an ordinary brace applied to the rod $f$.

Having now described the several parts, I will explain the clamping device and its mode of operation.

It will be observed that the arm or rod $c$ is round, having to pass through the shell $d$, also the stud $d'$. The parts are formed so that the said rod may easily move through the holes made in the shell and the stud. A hole is made in the end of permanent arm $a$, through which the screw-threaded end of stud $d'$ passes. I also preferably place the washer $h$ under the thumb-nut $e$. It will be noticed that the inner end of the shell $d$ presses against the side of the arm $a$ and that the stud $d'$ is shorter in its body than the length of the shell, so that when in position for operation there will remain a space (indicated by $d^2$) between the inner end of the body of the stud and the adjacent side of arm $a$. The stud $d'$ is formed to easily move within the shell $d$. Now when the parts are in position the thumb-nut is screwed down, thereby drawing the stud $d'$ toward the arm $a$, the outer end being thereby firmly drawn upon the surface of the rod $c$, and by the same action of the thumb-nut the shell, pressing at its inner end upon the side of arm $a$, is forced against the opposite side of the rod $c$. In this manner the said rod is powerfully gripped and immovably held, thereby securing the parts of the borer proper fixedly at any angle desired.

The powerful pressure exerted in both directions upon the rod $c$ by a slight pressure of the thumb-nut screwed down upon the side of the arm $a$ or upon the washer $h$ is sufficient to hold the borer at any angle without slipping and without injuring the surface of the rod. The lower end of the rod $c$ being pivoted to the part $b$ permits the freest action of the parts when the thumb-nut is loosened.

I make no claim in this application to the ordinary parts of the borer nor to the several arms and parts forming the knuckle-joint connection D, as these have been used before.

I am aware that angle-borers have been held in position by two fixed circular arms or braces with an ordinary set-nut moving in a circular slot formed in one of the said arms, but this is not my invention.

In practical operation it has been found that holding the several parts of the borer at an acute angle brings considerable strain and that the method of holding the parts at an angle, heretofore employed, has not been sufficiently strong, so that there has not been a liability of slipping, whereby the angle of the operative parts was changed.

By my present device I am able to obtain a clamp of much greater power and more readily and easily adjusted than any heretofore known to me used for a similar purpose.

Having now described my invention, what I claim, and desire to secure by Letters Patent of the United States, is—

1. The angle-borer herein described, consisting of the handle part A, frame B, provided with the bit-holder C, the knuckle-jointed forked mechanism D, uniting the said handle part and frame, the fixed arm $a$, the bar $c$, pivotally connected with the frame B, the shell $d$, provided with a hole to receive the bar $c$, the interior stud $d'$, provided with the threaded end $d^3$, and having a hole to receive the bar $c$, and the thumb-nut $c'$, all combined and adapted to operate substantially as set forth.

2. In an angle-borer, provided with a handle and frame, knuckle-jointed at the contiguous ends, a round bar, pivotally connected at one end with one part of the borer, and adapted to be adjustably secured to a fixed arm, secured to the other part of the borer, by means of a shell, movable screw-threaded stud and a thumb-nut, the said bar loosely passing through said shell and stud by a hole, and adapted to be gripped and held, all combined substantially as and for the purposes set forth.

In testimony whereof I have signed my name to this specification, in the presence of two subscribing witnesses, on this 31st day of October, A. D. 1896.

WILLIAM H. McCOY.

Witnesses:
E. S. ELLIOT,
GEO. W. NINES.